United States Patent
Shibata et al.

(10) Patent No.: US 10,760,319 B2
(45) Date of Patent: Sep. 1, 2020

(54) OPEN-CLOSE BODY DRIVING DEVICE

(71) Applicant: DENSO CORPORATION, Kariya, Aichi (JP)

(72) Inventors: Kazuyuki Shibata, Kariya (JP); Nobuo Mizutani, Kariya (JP)

(73) Assignee: DENSO CORPORATION, Kariya (JP)

( * ) Notice: Subject to any disclaimer, the term of this patent is extended or adjusted under 35 U.S.C. 154(b) by 217 days.

(21) Appl. No.: 16/123,815

(22) Filed: Sep. 6, 2018

(65) Prior Publication Data

US 2019/0085611 A1 Mar. 21, 2019

(30) Foreign Application Priority Data

Sep. 14, 2017 (JP) ................................. 2017-176788

(51) Int. Cl.
| | |
|---|---|
| *H02P 1/54* | (2006.01) |
| *H02P 3/00* | (2006.01) |
| *H02P 5/00* | (2016.01) |
| *E05F 15/60* | (2015.01) |
| *B60J 1/17* | (2006.01) |
| *E05F 15/695* | (2015.01) |
| *E05F 15/73* | (2015.01) |

(52) U.S. Cl.
CPC ................. *E05F 15/60* (2015.01); *B60J 1/17* (2013.01); *E05F 15/695* (2015.01); *E05F 15/73* (2015.01); *E05Y 2400/36* (2013.01); *E05Y 2400/854* (2013.01); *E05Y 2900/55* (2013.01)

(58) Field of Classification Search
CPC ........ E05F 15/60; E05F 15/695; E05F 15/689
USPC ............................................................. 318/62
See application file for complete search history.

(56) References Cited

U.S. PATENT DOCUMENTS

| | | | |
|---|---|---|---|
| 10,233,686 B2 * | 3/2019 | Smith | E05F 15/695 |
| 10,662,695 B2 * | 5/2020 | Yanagita | B60J 1/17 |
| 2005/0275363 A1 * | 12/2005 | Honma | E05F 15/659 |
| | | | 318/280 |
| 2006/0232100 A1 * | 10/2006 | Kamiya | F16D 48/064 |
| | | | 296/147 |
| 2008/0027589 A1 | 1/2008 | Hiwano et al. | |
| 2009/0212905 A1 * | 8/2009 | Batz | G07C 9/00944 |
| | | | 340/5.54 |

FOREIGN PATENT DOCUMENTS

| | | |
|---|---|---|
| JP | 2006-104665 A | 4/2006 |
| JP | 4862278 B2 | 1/2012 |

* cited by examiner

*Primary Examiner* — Erick D Glass
(74) *Attorney, Agent, or Firm* — Oliff PLC

(57) ABSTRACT

An open-close body driving device includes a motor configured to open and close an open-close body included in a vehicle and a controller controlling a movement speed of the open-close body driven by the motor. The controller is configured to move the open-close body at a normal speed based on a vehicle-side operating signal output by operation of an operating switch installed on the vehicle and at a speed lower than the normal speed based on a remote operating signal output by operation of a mobile device. The controller is configured so that in a shutting region having a predetermined dimension from a fully-closed position toward an open side, closing movement of the open-close body based on the remote operating signal is slower than closing movement of the open-close body based on the vehicle-side operating signal.

8 Claims, 3 Drawing Sheets

OPEN-CLOSE BODY DRIVING DEVICE

BACKGROUND ART

The present disclosure relates to an open-close body driving device such as a power window device or a sunroof device installed in a vehicle.

In the prior art, a vehicle includes an open-close body driving device capable of moving an open-close body in response to an remote operation performed by a mobile device even at a location distant from the vehicle (for example, refer to Japanese Laid-Open Patent Publication No. 2006-104665).

When the open-close body is moved by a remote operation, the operator may not be able to check the condition around the vehicle. Thus, when the open-close body is moved by a remote operation, the risk of interfering with an object (object entrapment during closing movement or object jamming during opening movement) may be higher than when the open-close body is moved by a normal operation (operation performed with an operating switch installed in the vehicle).

SUMMARY OF THE INVENTION

It is an object of the present disclosure to provide an open-close body driving device that limits occurrence of interference of an open-close body with an object when the open-close body is moved by a remote operation.

To achieve the above object, an open-close body driving device includes a motor configured to open and close an open-close body included in a vehicle and a controller controlling a movement speed of the open-close body driven by the motor. The controller is configured to move the open-close body at a normal speed based on a vehicle-side operating signal output by operation of an operating switch installed on the vehicle and at a speed lower than the normal speed based on a remote operating signal output by operation of a mobile device. The controller is configured so that in a shutting region having a predetermined dimension from a fully-closed position toward an open side, closing movement of the open-close body based on the remote operating signal is slower than closing movement of the open-close body based on the vehicle-side operating signal.

BRIEF DESCRIPTION OF THE DRAWINGS

The embodiments, together with objects and advantages thereof, may best be understood by reference to the following description of the presently preferred embodiments together with the accompanying drawings in which.

DETAILED DESCRIPTION OF THE PREFERRED EMBODIMENTS

One embodiment of an open-close body driving device will now be described.

Figure 1:
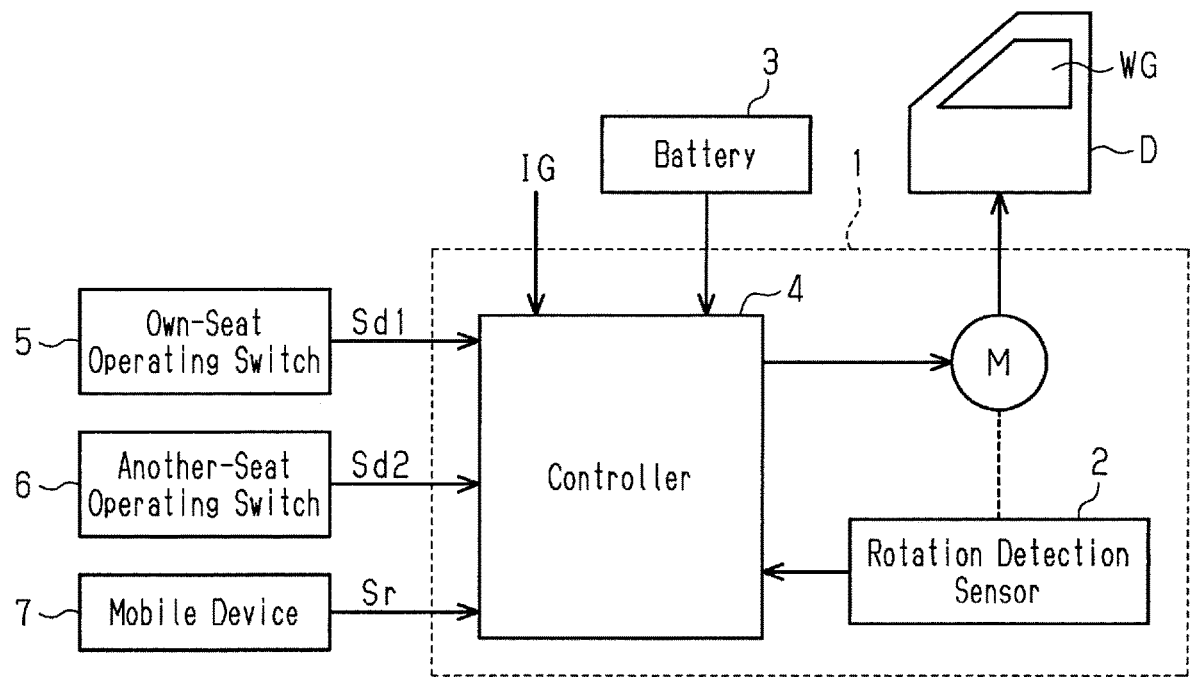
FIG. 1 is a schematic diagram showing the configuration of one embodiment of a power window device.

As shown in FIG. 1, a vehicle door D includes a vertically movable window glass WG, which corresponds to an open-close body. The window glass WG is connected to and driven by a motor M of a power window device 1 (open-close body driving device) via a wire-type or X-arm type regulator (not shown). The motor M may be a brushed motor or a brushless motor.

The power window device 1 includes a rotation detection sensor 2 such as a Hall sensor detecting rotation of the motor M and a controller 4. The controller 4 supplies power from a battery 3 to the motor M based on a signal from the rotation detection sensor 2 and a driving instruction signal, which will be described later. The rotation detection sensor 2 transmits a pulse signal corresponding to rotation of the motor M to the controller 4. The controller 4 performs various controls to drive the motor M while obtaining the position and speed of the window glass WG from the received pulse signal.

More specifically, the controller 4 drives and controls the motor M so that the window glass WG is closed or opened based on input of a driving instruction signal. The driving instruction signal includes, for example, an own-seat operating signal Sd1 (vehicle-side operating signal) output in accordance with operation of an own-seat operating switch 5 that is installed on the vehicle door D, an another-seat operating signal Sd2 (vehicle-side operating signal) output in accordance with operation of an another-seat operating switch 6 that is installed on a vehicle door differing from the vehicle door D, and a remote operating signal Sr output in accordance with operation of a mobile device 7 such as a wireless key.

If the controller 4 determines that entrapment has occurred based on, for example, a pulse signal from the rotation detection sensor 2, the controller 4 performs anti-entrapment control that stops the closing movement of the window glass WG (or stops the closing movement and then reversely drives the window glass WG).

The controller 4 obtains various kinds of necessary vehicle information from a body ECU (host ECU), which is not shown in the drawings. The vehicle information that the controller 4 obtains from the body ECU is, for example, an on-off signal (ignition signal IG) of a known ignition switch installed in the vehicle.

Speed control of closing movement of the window glass WG performed by the controller 4 will now be described.

The controller 4 has a speed control pattern of closing movement in relation to the position of the window glass WG and performs speed control on opening and closing movement of the window glass WG based on the speed control pattern. The speed control pattern is stored in advance in a memory, which is not shown in the drawings. In the present embodiment, the speed control pattern includes multiple patterns. More specifically, the speed control pattern includes a normal speed control pattern Pa shown in FIG. 2A, a first low speed control pattern Pb shown in FIG. 2B, and a second low speed control pattern Pc shown in FIG. 2C.

Figure 2A:
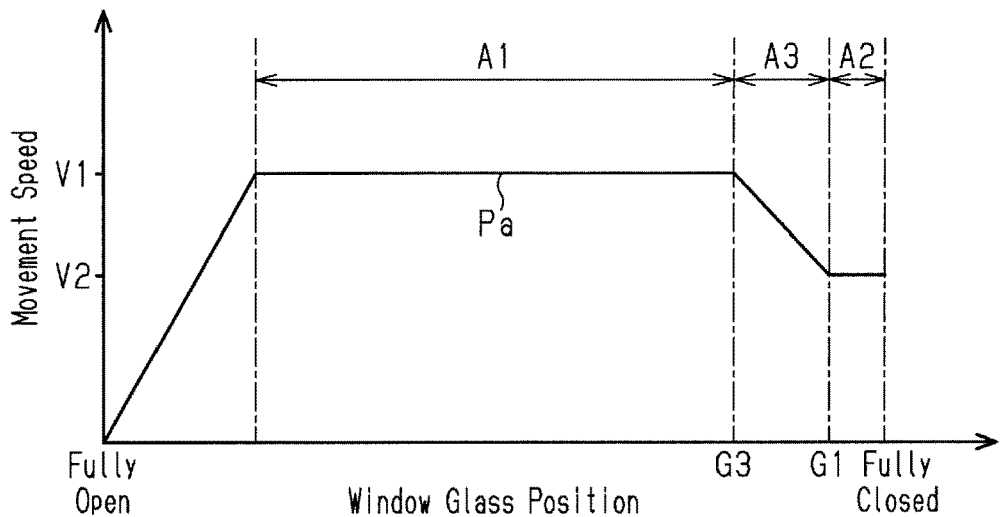
FIG. 2A is a graph showing a normal speed control pattern.

As shown in FIG. 2A, the normal speed control pattern Pa has a constant speed section A1 in which the window glass WG closes at a constant first speed V1. In the normal speed control pattern Pa, when the window glass WG exceeds the constant speed section A1, slow stop control that reduces the movement speed of the window glass WG is performed. In the present embodiment, the normal speed control pattern Pa has a constant low speed section A2 extending from a fully-closed position to a predetermined position G1 toward an open side and a deceleration section A3 that is set between the constant speed section A1 and the constant low speed section A2. In the constant low speed section A2 of the normal speed control pattern Pa, the window glass WG closes at a constant second speed V2 that is lower than the first speed V1. In the deceleration section A3 of the normal speed control pattern Pa, the speed of closing movement of the window glass WG is reduced from the first speed V1 to the second speed V2.

Figure 2B:
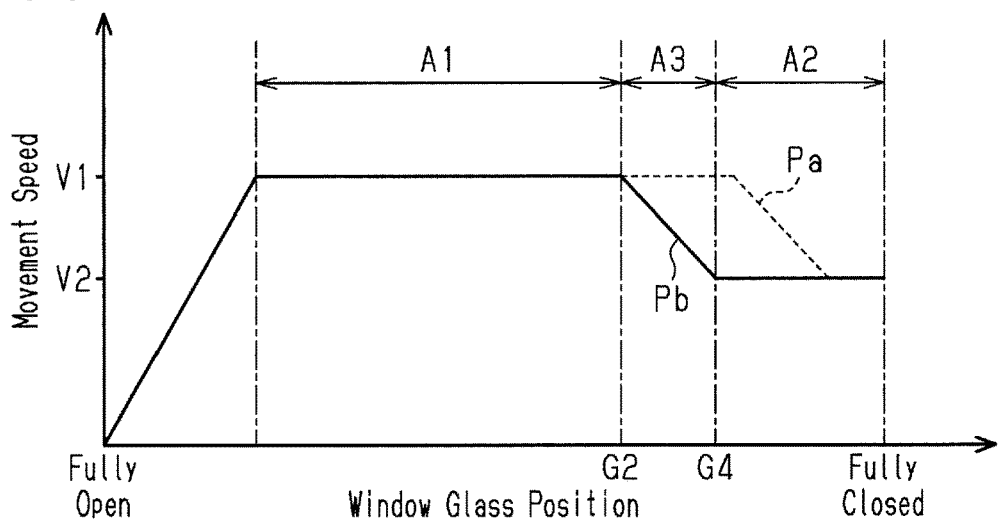
FIG. 2B is a graph showing a first low speed control pattern.

As shown in FIG. 2B, the first low speed control pattern Pb is a pattern in which the starting positions of the deceleration section A3 and the constant low speed section A2 in the normal speed control pattern Pa are shifted toward the open side. More specifically, in the constant speed section A1 of the first low speed control pattern Pb, the window glass WG closes at the constant first speed V1 in the same manner as the normal speed control pattern Pa. In the constant low speed section A2 of the first low speed control pattern Pb, the window glass WG closes at the constant second speed V2 in the same manner as the normal speed control pattern Pa. In the deceleration section A3 of the first low speed control pattern Pb, the speed of closing movement of the window glass WG is reduced from the first speed V1 to the second speed V2.

A starting position G2 of the deceleration section A3 in the first low speed control pattern Pb is set at the open side of a starting position G3 of the deceleration section A3 in the normal speed control pattern Pa. A starting position G4 of the constant low speed section A2 in the first low speed control pattern Pb is set at the open side of the starting position G1 of the constant low speed section A2 in the normal speed control pattern Pa. In other words, the constant low speed section A2 of the first low speed control pattern Pb is set to be longer than the constant low speed section A2 of the normal speed control pattern Pa. In the present embodiment, the deceleration section A3 of the first low speed control pattern Pb is set to be equal to the deceleration section A3 of the normal speed control pattern Pa. That is, the normal speed control pattern Pa and the first low speed control pattern Pb have the same deceleration rate in the deceleration section A3.

Figure 2C:
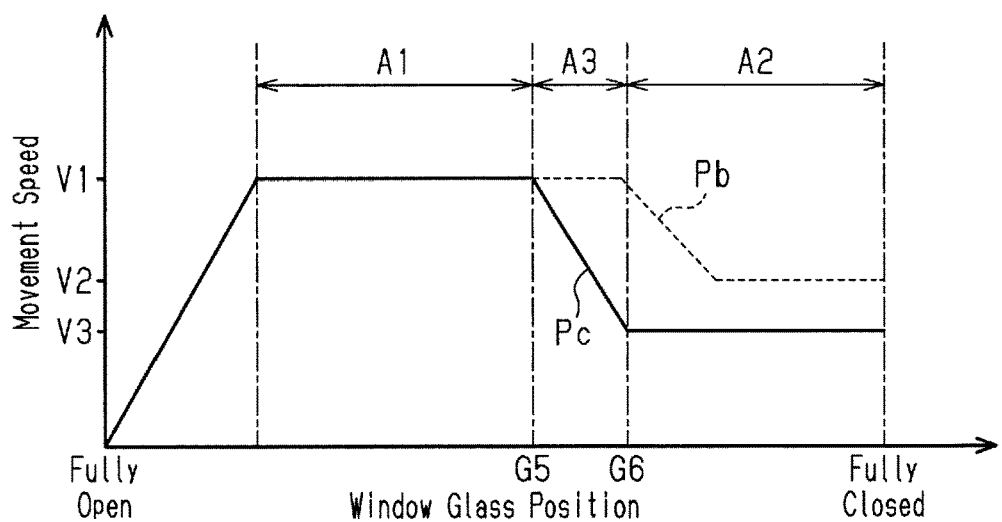
FIG. 2C is a graph showing a second low speed control pattern.

As shown in FIG. 2C, the second low speed control pattern Pc is a pattern in which the starting positions of the deceleration section A3 and the constant low speed section A2 in the first low speed control pattern Pb are shifted toward the open side and the movement speed in the constant low speed section A2 is set to a constant third speed V3 that is lower than the second speed V2. More specifically, in the constant speed section A1 of the second low speed control pattern Pc, the window glass WG closes at the constant first speed V1 in the same manner as the normal speed control pattern Pa. In the constant low speed section A2 of the second low speed control pattern Pc, the window glass WG closes at the constant third speed V3, which is lower than the second speed V2. In the deceleration section A3 of the second low speed control pattern Pc, the speed of closing movement of the window glass WG is reduced from the first speed V1 to the third speed V3.

Additionally, a starting position G5 of the deceleration section A3 in the second low speed control pattern Pc is set at the open side of the starting position G2 of the deceleration section A3 in the first low speed control pattern Pb. A starting position G6 of the constant low speed section A2 in the second low speed control pattern Pc is set at the open side of the starting position G4 of the constant low speed section A2 in the first low speed control pattern Pb. That is, the constant low speed section A2 of the second low speed control pattern Pc is set to be longer than the constant low speed section A2 of the first low speed control pattern Pb. In the present embodiment, the deceleration section A3 of the second low speed control pattern Pc is set to the same length as the deceleration sections A3 of the second low speed control pattern Pc and the normal speed control pattern Pa.

In the three control patterns Pa, Pb, and Pc described above, the starting positions of the constant speed sections A1 are set to the same position, and the movement speed of the window glass WG is increased to the first speed V1 in a section from a fully-open position to the starting position of the constant speed section A1 (slow start control).

The control mode of the controller 4 during closing movement of the window glass WG will now be described.

Figure 3:
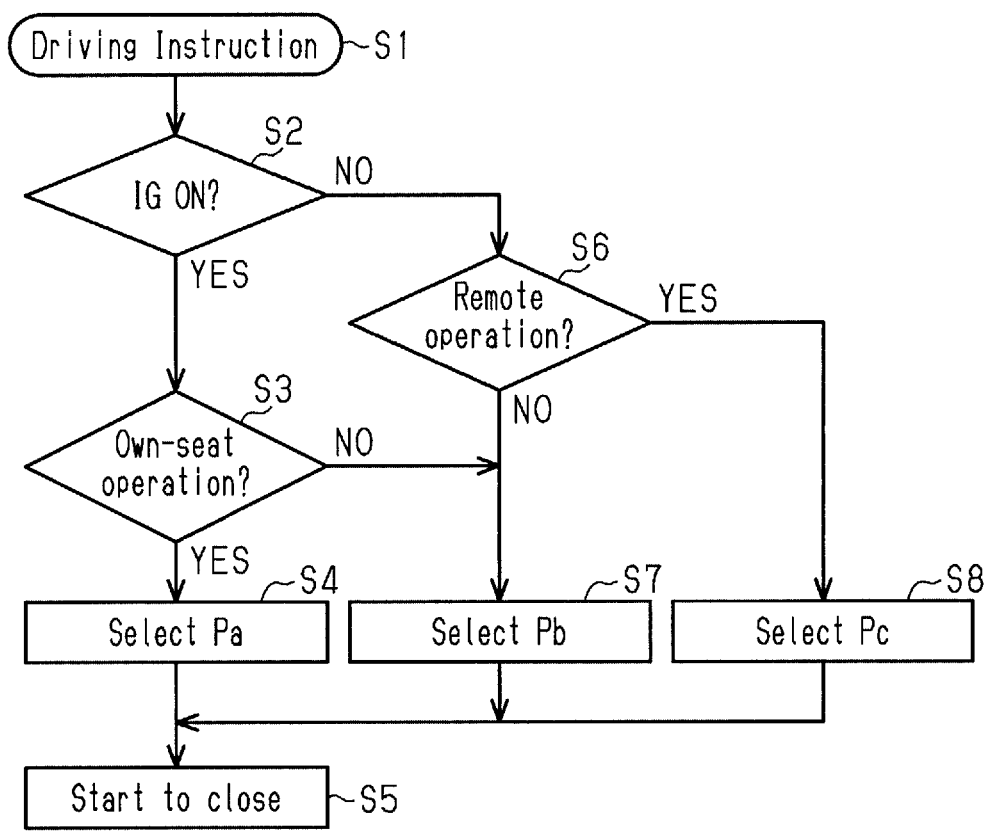
FIG. 3 is a flowchart showing a process of a controller.

As shown in FIG. 3, in step S1, when the controller 4 receives a driving instruction signal for closing the window glass WG, the controller 4 proceeds to step S2.

In step S2, the controller 4 determines whether the ignition signal IG is activated or deactivated. If the ignition signal IG is activated, the controller 4 proceeds to step S3.

In step S3, the controller 4 determines whether the driving instruction signal received in step S1 is the own-seat operating signal Sd1. If the driving instruction signal is the own-seat operating signal Sd1, the controller 4 proceeds to step S4.

In step S4, the controller 4 selects the normal speed control pattern Pa and proceeds to step S5.

In step S5, the controller 4 starts to close the window glass WG based on the speed control pattern selected in the preceding step (step S4, S7, or S8).

If the ignition signal IG is deactivated in step S2, the controller 4 proceeds to step S6.

In step S6, the controller 4 determines whether the driving instruction signal received in step S1 is the remote operating signal Sr. If the driving instruction signal is not the remote operating signal Sr, that is, the driving instruction signal is one of the own-seat operating signal Sd1 and the another-seat operating signal Sd2, the controller 4 proceeds to step S7.

In step S7, the controller 4 selects the first low speed control pattern Pb and proceeds to step S5.

In step S3, if the controller 4 determines that the driving instruction signal received in step S1 is not the own-seat operating signal Sd1 (i.e., the driving instruction signal is one of the another-seat operating signal Sd2 and the remote operating signal Sr), the controller 4 proceeds to step S7.

In step S6, if the controller 4 determines that the driving instruction signal received in step S1 is the remote operating signal Sr, the controller 4 proceeds to step S8.

In step S8, the controller 4 selects the second low speed control pattern Pc and proceeds to step S5.

The operation of the power window device 1 will now be described.

When the ignition switch is on and a closing operation is performed on the own-seat operating switch 5, the window glass WG closes at speeds corresponding to the normal speed control pattern Pa. When the ignition switch is on and a closing operation is performed on the another-seat operating switch 6, the window glass WG closes at speeds corresponding to the first low speed control pattern Pb. When the ignition switch is on and a closing operation is performed by the mobile device 7, the window glass WG closes at speeds corresponding to the first low speed control pattern Pb.

When the ignition switch is off and a closing operation is performed on the own-seat operating switch 5, the window glass WG closes at speeds corresponding to the first low speed control pattern Pb. Also, when the ignition switch is off and a closing operation is performed on the another-seat operating switch 6, the window glass WG closes at speeds corresponding to the first low speed control pattern Pb.

When the ignition switch is off and a closing operation is performed by the mobile device 7, the window glass WG closes at speeds corresponding to the second low speed control pattern Pc. As described above, in the second low speed control pattern Pc, the window glass WG closes at lower speeds than in the normal speed control pattern Pa and the first low speed control pattern Pb. Thus, when the window glass WG is closed by a remote operation, occurrence of interference of the window glass WG with an object (e.g., entrapment) is limited.

The present embodiment has the advantages described below.

(1) The controller 4 closes the window glass WG at normal speeds (speeds corresponding to the normal speed control pattern Pa) based on the own-seat operating signal Sd1 output by operation of the own-seat operating switch 5 installed on the vehicle. The controller 4 closes the window glass WG at speeds lower than the normal speeds (speeds corresponding to the second low speed control pattern Pc) based on the remote operating signal Sr output by operation of the mobile device 7. This limits occurrence of interference of the window glass WG with an object (e.g., object entrapment) when the window glass WG is closed by a remote operation. During the remote operation, if object entrapment occurs, the controller 4 performs anti-entrapment control as described above. During the remote operation, the window glass WG moves at low speed. This reduces the load applied to the object during anti-entrapment control.

When the window glass WG is closed using the own-seat operating switch 5 (normal operation), the operator is able to closely check the condition around the window glass WG. Thus, when the window glass WG is closed by the normal operation, it is preferred that the window glass WG be closed at the normal speeds (speeds corresponding to the normal speed control pattern Pa) in consideration for maintaining the usability of the normal operation.

(2) The controller 4 closes the window glass WG at speeds lower than the normal speeds (speeds corresponding to the second low speed control pattern Pc) based on input of both the remote operating signal Sr and a signal indicating that the vehicle ignition switch is off. When the ignition switch is off, that is, the vehicle is stopped, the remote operator may be away from the vehicle. This further favorably produces the effect of limiting interference with an object during a remote operation.

(3) When the window glass WG closes in a shutting region having a predetermined dimension from the fully-closed position toward the open side (region including at least a section from the position G1 to the fully-closed position), the controller 4 sets the movement based on the remote operating signal Sr to be slower than the movement based on the own-seat operating signal Sd1. In this configuration, in the shutting region, where object entrapment relatively easily occurs, closing movement of the window glass WG caused by a remote operation is slow. This appropriately limits occurrence of object entrapment of the window glass WG.

(4) The normal speed control pattern Pa includes the constant speed section A1 in which the window glass WG closes at the constant first speed V1, the deceleration section A3 set at the closed side of the constant speed section A1 to reduce the speed of the closing movement of the window glass WG from the first speed V1, and the constant low speed section A2 set between the deceleration section A3 and the fully-closed position to close the window glass WG at the constant second speed V2, which is lower than the first speed V1. In this configuration, slow stop control that reduces the speed of the window glass WG when the window glass WG approaches the fully-closed position so that the window glass WG reaches the fully-closed position at low speed is performed. Thus, during closing movement of the window glass WG, occurrence of object entrapment is appropriately limited.

(5) The second low speed control pattern Pc is a pattern in which the speed of the constant low speed section A2 in the normal speed control pattern Pa is set to the third speed V3, which is lower than the second speed V2. More specifically, as shown in FIG. 2A, the closing movement of the window glass WG based on the own-seat operating signal Sd1 includes the constant speed section A1 in which the window glass WG closes at the constant first speed V1 and the constant low speed section A2 in which the window glass WG closes at the constant second speed V2, which is lower than the first speed V1. As shown in FIG. 2C, the closing movement of the window glass WG based on the remote operating signal Sr includes the constant speed section A1 in which the window glass WG closes at the constant first speed V1 and the constant low speed section A2 in which the window glass WG closes at the constant third speed V3, which is lower than the second speed V2. In this configuration, in the vicinity of the fully-closed position where object entrapment relatively easily occurs (constant low speed section A2), the window glass WG is closed by a remote operation at further lower speed. This appropriately limits occurrence of object entrapment of the window glass WG.

(6) The first low speed control pattern Pb and the second low speed control pattern Pc are patterns in which the starting position G3 of the deceleration section A3 in the normal speed control pattern Pa is shifted toward the open side. More specifically, as shown in FIG. 2A, the closing movement of the window glass WG based on the own-seat operating signal Sd1 further includes the deceleration section A3 in which the speed of closing movement of the window glass WG is reduced from the first speed V1 to the second speed V2. As shown in FIG. 2C, the closing movement of the window glass WG based on the remote operating signal Sr further includes the deceleration section A3 in which the speed of the closing movement of the window glass WG is reduced from the first speed V1 to the third speed V3. The starting position G5 of the deceleration section A3 in the closing movement of the window glass WG based on the remote operating signal Sr is shifted toward the open side from the starting position G3 of the deceleration section A3 in the closing movement of the window glass WG based on the own-seat operating signal Sd1. This configuration advances the starting of the deceleration section A3 in the closing operation of the window glass WG caused by a remote operation (the starting position G2 of the deceleration section A3 of the first low speed control pattern Pb or the starting position G5 of the deceleration section A3 of the second low speed control pattern Pc). This appropriately limits occurrence of object entrapment.

(7) The controller 4 moves the window glass WG in accordance with the first low speed control pattern Pb, which uses lower speeds than the normal speed control pattern Pa, based on input of the another-seat operating signal Sd2. Thus, when the window glass WG is moved by operation of the another-seat operating switch 6, interference of the window glass WG with an object (e.g., object entrapment) is limited.

The embodiment may be modified as follows.

The control may be modified so that when the ignition switch is off and a closing operation is performed on the own-seat operating switch 5, the window glass WG closes at speeds corresponding to the normal speed control pattern Pa.

The control may be modified so that when the ignition switch is on and a closing operation is performed by the mobile device 7, the window glass WG closes at speeds corresponding to the second low speed control pattern Pc. The control may be modified so that when the ignition switch is on and a closing operation is performed by the mobile device 7, the window glass WG closes at speeds corresponding to the normal speed control pattern Pa.

In the embodiment, the low speed control pattern includes two patterns, namely, the first and second low speed control patterns Pb and Pc. Instead, only one of the first and second low speed control patterns Pb and Pc may be included. The control may be modified so that, for example, when the driving instruction signal is a signal corresponding to operation of the operating switches installed on the vehicle (own-seat operating switch 5 and another-seat operating switch 6), the normal speed control pattern Pa is selected, and when the driving instruction signal is the remote operating signal Sr, the first low speed control pattern Pb (or second low speed control pattern Pc) is selected.

The low speed control pattern does not necessarily have to be included. For example, instead of using the second low speed control pattern Pc (or first low speed control pattern Pb), a correction value may be calculated and used based on the normal speed control pattern Pa.

The speed setting of the first low speed control pattern Pb is not limited to that of the embodiment and may be modified. For example, while the constant low speed section A2 of the first low speed control pattern Pb is set to the same length as that of the normal speed control pattern Pa, only the starting position of the deceleration section A3 may be shifted toward the open side.

The speed setting of the second low speed control pattern Pc is not limited to that of the embodiment and may be modified. For example, the deceleration section A3 and the constant low speed section A2 of the second low speed control pattern Pc may be set to the same length as those of the normal speed control pattern Pa. For example, the speed of the constant speed section A1 of the second low speed control pattern Pc may be set to a speed lower than the first speed V1. That is, in the range from the fully-open position to the fully-closed position, the speeds of the second low speed control pattern Pc may be lower than the speeds of the normal speed control pattern Pa.

In the above embodiment, the control according to the present disclosure is applied to closing movement of the window glass WG to cope with, for example, object entrapment. The control according to the present disclosure may be applied to opening movement of the window glass WG to cope with, for example, object jamming.

In the above embodiment, the control according to the present disclosure is embodied in the power window device 1 of a vehicle. Instead, the control according to the present disclosure may be embodied in an open-close body driving device that drives and controls an open-close body other than the window glass WG (e.g., sunroof or sliding door).

The above embodiment and modified examples may be appropriately combined.

The controller 4 is not limited to one including a central processing unit and memory to execute the processes described above using software. For example, the controller 4 may include dedicated hardware (application specific integrated circuit: ASIC) executing at least some of the processes. More specifically, the controller 4 may be circuitry that includes 1) one or more dedicated hardware circuits such as an ASIC, 2) one or more processors (microcomputers) operating in accordance with computer programs (software), or 3) a combination of these.

The invention claimed is:

1. An open-close body driving device comprising:
   a motor configured to open and close an open-close body included in a vehicle; and
   a controller controlling a movement speed of the open-close body driven by the motor, wherein
   the controller is configured to move the open-close body at a normal speed based on a vehicle-side operating signal output by operation of an operating switch installed on the vehicle and at a speed lower than the normal speed based on a remote operating signal output by operation of a mobile device, and
   the controller is configured so that in a shutting region having a predetermined dimension from a fully-closed position toward an open side, closing movement of the open-close body based on the remote operating signal is slower than closing movement of the open-close body based on the vehicle-side operating signal.

2. The open-close body driving device according to claim 1, wherein the controller is configured to move the open-close body at a speed lower than the normal speed based on input of both the remote operating signal and a signal indicating that an ignition switch of the vehicle is off.

3. The open-close body driving device according to claim 1, wherein
   the controller has a speed control pattern of closing movement in relation to a position of the open-close body and controls speed of the closing movement of the open-close body based on the speed control pattern,
   the speed control pattern includes multiple patterns including at least a normal speed control pattern and a low speed control pattern using a lower speed than the normal speed control pattern, and
   the controller closes the open-close body using the normal speed control pattern based on the vehicle-side operating signal and closes the open-close body using the low speed control pattern based on the remote operating signal.

4. The open-close body driving device according to claim 3, wherein the normal speed control pattern includes a constant speed section in which the open-close body closes at a constant first speed, a deceleration section that is set at a closed side of the constant speed section to reduce speed of closing movement of the open-close body from the first speed, and a constant low speed section that is set between the deceleration section and the fully-closed position to close the open-close body at a constant second speed that is lower than the first speed.

5. The open-close body driving device according to claim 4, wherein the low speed control pattern is a pattern in which speed of the constant low speed section in the normal speed control pattern is lower than the second speed.

6. The open-close body driving device according to claim 5, wherein the low speed control pattern is a pattern in which a starting position of the deceleration section in the normal speed control pattern is shifted toward the open side.

7. The open-close body driving device according to claim 1, wherein
   closing movement of the open-close body based on the vehicle-side operating signal includes a constant speed section in which the open-close body closes at a constant first speed and a constant low speed section in which the open-close body closes at a constant second speed that is lower than the first speed, and
   closing movement of the open-close body based on the remote operating signal includes a constant speed section in which the open-close body closes at the constant first speed and a constant low speed section in which the open-close body closes at a constant third speed that is lower than the second speed.

8. The open-close body driving device according to claim 7, wherein
   the closing movement of the open-close body based on the vehicle-side operating signal further includes a deceleration section in which speed of the closing movement of the open-close body is reduced from the first speed to the second speed,
   the closing movement of the open-close body based on the remote operating signal further includes a deceleration section in which speed of the closing movement of the open-close body is reduced from the first speed to the third speed, and
   a starting position of the deceleration section in the closing movement of the open-close body based on the remote operating signal is shifted toward the open side from a starting position of the deceleration section in the closing movement of the open-close body based on the vehicle-side operating signal.

* * * * *